(12) United States Patent
Koren

(10) Patent No.: US 6,398,397 B1
(45) Date of Patent: Jun. 4, 2002

(54) FIBER OPTIC POOL LIGHTING APPARATUS

(75) Inventor: Pinhas Paul Koren, Altamonte Springs, FL (US)

(73) Assignee: Super Vision International, Inc., Orlando, FL (US)

( * ) Notice: Subject to any disclaimer, the term of this patent is extended or adjusted under 35 U.S.C. 154(b) by 0 days.

(21) Appl. No.: 09/749,052

(22) Filed: Dec. 27, 2000

Related U.S. Application Data

(60) Provisional application No. 60/190,432, filed on Mar. 17, 2000.

(51) Int. Cl.[7] .................................................. E04H 4/00
(52) U.S. Cl. ........................ 362/562; 362/554; 362/576; 362/101
(58) Field of Search ................................ 362/562, 559, 362/554, 576, 96, 101

(56) References Cited

U.S. PATENT DOCUMENTS

| | | | |
|---|---|---|---|
| 4,587,599 A | * | 5/1986 | St-Hilaire .................... 362/101 |
| 4,782,430 A | | 11/1988 | Robbins et al. |
| 5,170,517 A | | 12/1992 | Stegmeier |
| 5,887,295 A | | 3/1999 | Williamson |
| 6,039,453 A | * | 3/2000 | Wang .......................... 362/101 |
| 6,250,776 B1 | * | 6/2001 | Burkitt et al. ............... 362/267 |
| 6,275,634 B1 | * | 8/2001 | Potucek ....................... 385/115 |

* cited by examiner

Primary Examiner—Sandra O'Shea
Assistant Examiner—Ronald E. DelGizzi
(74) Attorney, Agent, or Firm—Beusse Brownlee Bowdoin & Wolter, P.A.; David G. Maire

(57) ABSTRACT

A pool lighting apparatus including a sealed lens assembly attached to a light emitting end of a fiber optic cable. The sealed lens assembly is installed into a standard pool wall fixture and is provided with redundant seals for preventing the passage of water there between. A glass lens is provided to be either flat or convex to provide the desired field of lighting. One or more removable protective covers may be applied to the lens to provide a desired color effect within the pool. A metal cutting ring is disposed about the fiber optic cable within the sealed lens assembly to provide a flat surface for guiding a cutting tool for forming a planer light emitting end on fiber optic cable.

14 Claims, 2 Drawing Sheets

FIBER OPTIC POOL LIGHTING APPARATUS

This application claims the benefit of the Mar. 17, 2000, filing date of United States provisional patent application number 60/190,432.

BACKGROUND OF THE INVENTION

This invention relates generally to the field of pool lighting fixtures, and more particularly to a fiber optic pool lighting fixture, and specifically to a pool lighting apparatus wherein a lens assembly is sealed to the end of a fiber optic cable and further sealed within a fixture installed in a pool wall.

A variety of lighting devices are known for supplying light to a pool. The term pool is used herein to include swimming pools, spas, hot tubs, and the like. Perhaps the most common type of pool lighting fixture is an incandescent lamp sealed within a fixture installed in the wall of the pool. Incandescent lamps generally produce a significant amount of heat energy which must be dissipated in order to prevent damage to the lighting fixture and surrounding materials. Incandescent lamps also generally require the use of high voltage electricity which may pose a safety concern for users of the pool.

Fiber optic light sources are capable of providing a variety of lighting effects within or near a pool without the heat or safety concerns of incandescent lamps, since the illuminating bulb for a fiber optic lighting system may be located remote from the pool area. It is known to provide side-emitting fiber optic cables along the coping of a pool to provide a general area lighting effect. It is also known to utilize end-emitting fiber optic cables as point sources of light disposed in a fitting along a pool wall. Such prior art fiber optic lighting fixtures generally include a device for holding the light emitting end of a fiber optic cable proximate a protective plastic shield within an aperture in a pool wall. Because there is no concern for heat dissipation or electrical safety, such prior art fiber optic lighting devices are generally designed to have a single elastomeric gasket compressed between the protective shield and the lighting fixture for preventing the leakage of pool water past the fixture. Such prior art devices are known to require periodic maintenance in order to replace the protective plastic shield which will degrade due to the corrosive action of chlorine or other chemicals within the pool water.

BRIEF SUMMARY OF THE INVENTION

Accordingly, what is needed is an improved fiber optic lighting fixture that will require a lower amount of maintenance and that will provide an improved barrier to leakage into or out of the pool.

Accordingly, a pool lighting apparatus is described herein as including a fixture adapted to be sealed into an opening in a pool, the fixture having an aperture formed there through; a fiber optic light source comprising a fiber optic cable having a length adapted for passing into the fixture aperture and having a light emitting end; a lens assembly attached to the fiber optic cable, the lens assembly comprising a lens disposed proximate the light emitting end for receiving light from the light emitting end and transmitting the light into the pool; and the lens assembly further comprising a first seal apparatus for preventing the introduction of water between the light emitting end and the lens from outside the lens assembly.

The lens assembly may include a connector comprising a body having an aperture with a first elastomeric seal disposed therein for receiving the fiber optic cable and a nut adapted to be threaded onto the body for compression of the first elastomeric seal around the fiber optic cable proximate the light emitting end; and a lens holder sealed to the lens and adapted for a threaded engagement with the connector body with a first seal disposed there between for positioning the light emitting end proximate the lens and for preventing the introduction of water between the light emitting end and the lens.

BRIEF DESCRIPTION OF THE DRAWINGS

The above mentioned and other features and advantages of this invention will become more apparent and the invention will be better understood by reference to the following description when taken in conjunction with the accompanying drawings, wherein.

DETAILED DESCRIPTION OF THE INVENTION

Figure 1:
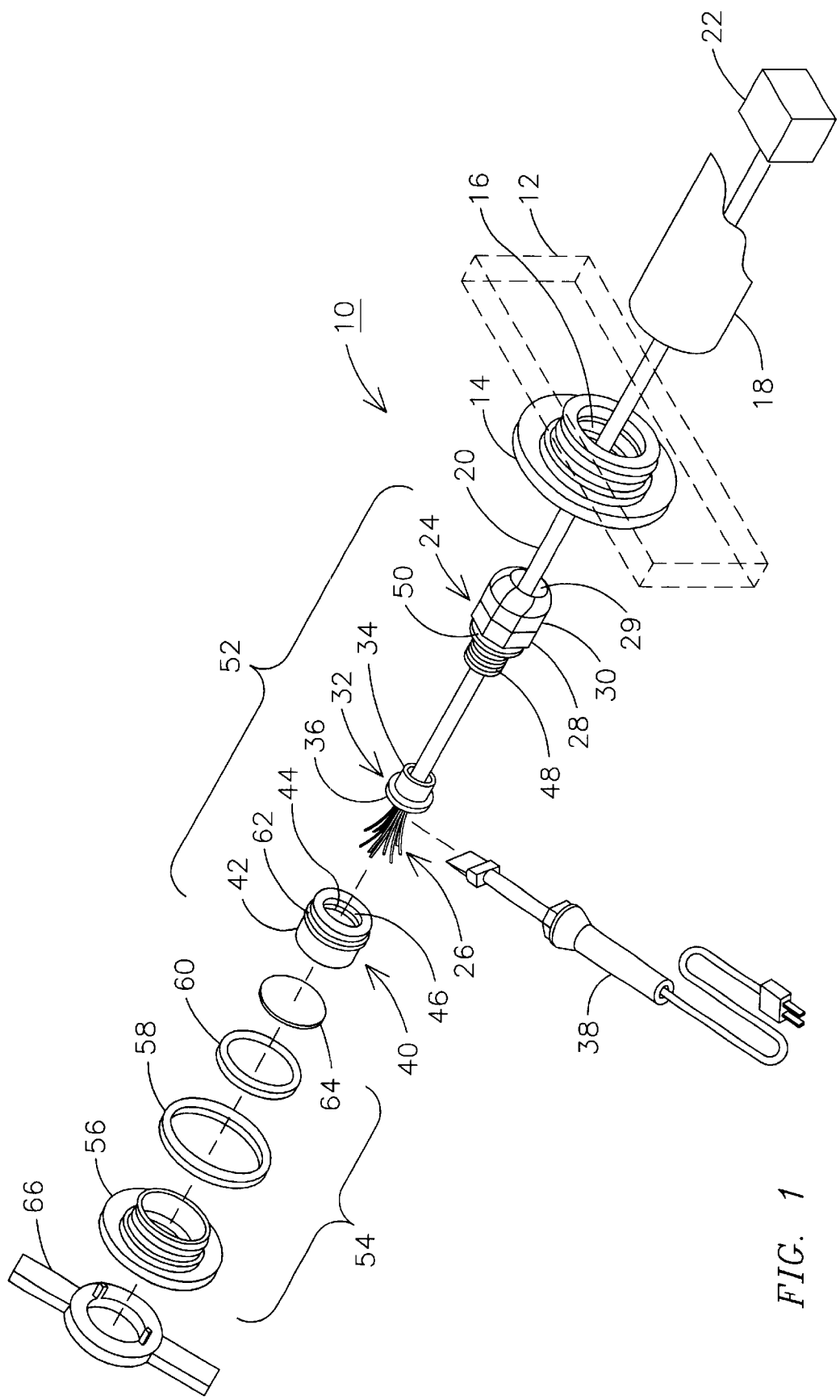
FIG. 1 is an exploded view of a fiber optic pool lighting apparatus adapted for installation in a concrete or gunite pool.

In the description which follows, similar parts are marked throughout the specification and drawings with the same reference numerals respectively.

Referring now to FIG. 1, there is illustrated a pool lighting apparatus 10 adapted for installation in the wall of a concrete or gunite pool 12. The pool lighting apparatus 10 includes a fixture 14 adapted to be sealed into an opening in a pool wall 12. The fixture 14 has an aperture 16 formed there through which is adapted to be aligned with the end of a protective tube 18 which may be installed under ground next to the pool 12. A fiber optic cable 20 forms part of a fiber optic light source 22 for delivering light to the pool 12. The high voltage, high temperature portions of fiber optic light source 22 may be located remote from the pool, as is known in the prior art, with the fiber optic cable 20 having a length passing through the protective tube 18 and into the fixture aperture 16.

A fiber tight connector 24 is attached to the fiber optic cable 20 proximate a light emitting end 26 of the fiber optic cable 20. The connector 24 includes a body portion 28 having an aperture with an elastomeric seal 29 disposed therein. One such connector known in the art is provided by Hayward Pool Products, Inc. under part number SP-1408. Connector 24 further includes a nut 30 adapted to be threaded onto the body portion 28 for compression of the elastomeric seal around the fiber optic cable 20. This compression fitting prevents the passage of water through the aperture of the connector 24 between the fiber optic cable 20 and the connector body 28.

A cutting ring 32 is disposed about the fiber optic cable 20 and may be formed to have a body portion 34 that may be press fit into a receiving aperture formed in body 28 of connector 24. Cutting ring 32 further includes a flat surface 36 adapted for guiding a hot knife or other cutting tool 38 for creating a smooth, planer surface on light emitting end 26. Cutting ring 32 is preferably formed of a metal or other heat resistant material.

A lens 42 is sealed to a lens holder 44, such as by gluing or sealing with silicone or other waterproof material. Lens holder 44 includes threads 46 formed on an inside diameter surface adapted for threaded engagement with mating threads 48 formed on connector 24. In this manner, the light emitting end 26 of fiber optic cable 20 is positioned proximate lens 42 so that light transmitted from the light emitting end 26 may pass through lens 42 and into pool 12. An O-ring 50 or other form of seal is disposed between the lens holder 44 and the connector body 28 for preventing the introduction of water between the light emitting end 26 and the lens 42. In this manner, a sealed lens assembly 52 is formed for positioning the light emitting end 26 of a fiber optic cable 20 proximate a lens 42.

The lens assembly 52 may be assembled poolside by pulling an excess length of fiber optic cable 20 through fitting 14 so that the light emitting end 26 extends well above the surface of the water in pool 12. The various components of lens assembly 52 may then be assembled, and the entire lens assembly 52 then moved into position in fixture 14. Once lens assembly 52 is inserted into fixture 14, a second seal apparatus 54 may be assembled for preventing the passage of water through the fixture aperture 16 between the lens assembly 52 and the fixture 14. This second seal apparatus 54 may include a lens nut 56 adapted for a threaded engagement with the fixture 14 to compress a first gasket 58 between the lens nut 56 and fitting 14, and a second gasket 60 between the lens nut 56 and one of the lens 42 and/or lens holder 44. An O-ring seal 62 disposed proximate a rear portion of lens holder 44 is also compressed against fixture 14 as lens nut 56 is tightened thereto. Thus, redundant seals are provided against the passage of water through aperture 16 around lens assembly 52. A first barrier is formed by the combination of seals 58, 60, and a second barrier is formed by seal 62.

Lens 42 may preferably be formed of glass in order to withstand the deleterious effects of pool water and sunlight. Lens 42 may be formed to be flat, convex or concave in shape in order to obtain a desired lighting effect. A protective cover such as film 64 may be applied to the outside surface of lens 42 to provide increased resistance against scratching during the assembly process. Such protective cover 62 may be removed upon the completion of the installation process. Alternatively, cover 62 may be formed as a color filter and may remain in place after installation to provide a color effect to the light. For such an embodiment, a plurality of different protective covers 64 may be provided in a plurality of different colors. Replacement of the protective cover 64 may be accomplished in a dry environment by simply removing lens nut 56 and pulling lens assembly 52 to above the water level. Lens nut 56 may be tightened and loosened by using a form of a spanner wrench 66 as is known in the art.

Figure 2:
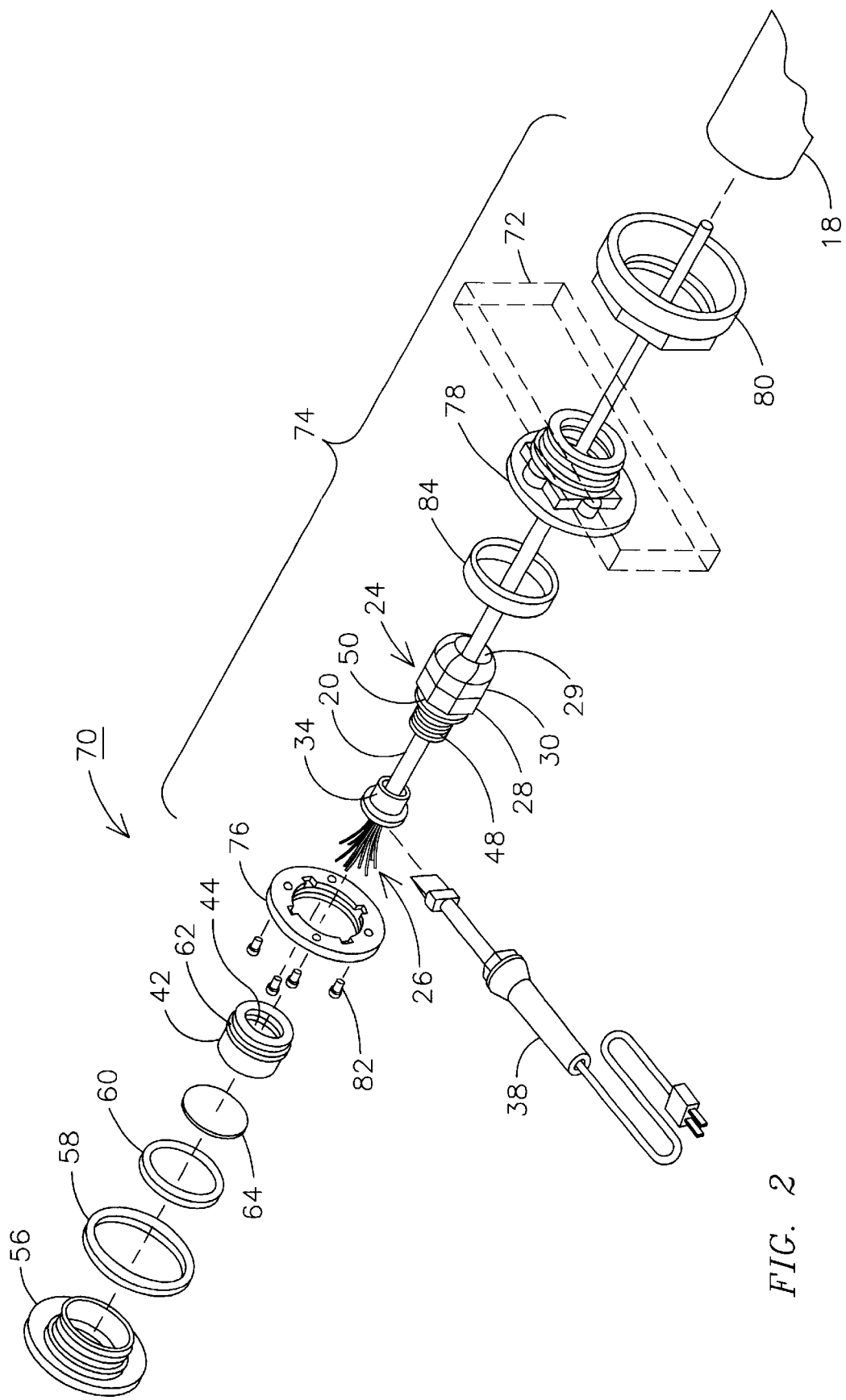
FIG. 2 is an exploded illustration of a fiber optic pool lighting apparatus adapted for installation in a vinyl pool.

FIG. 2 illustrates a pool lighting apparatus 70 adapted for installation in a wall of a vinyl pool 72. Most of the components of pool lighting apparatus 70 are identical to the pool lighting apparatus 10 of FIG. 1, as is seen by the components marked with identical numerals. For application to a vinyl pool 72, a different type of fixture assembly 74 is needed to form a sealed connection to the vinyl pool wall 72. Fixture assembly 74 includes a face plate 76, fitting 78, and lock nut 80. Face plate 76 is affixed to fitting 78 with a plurality of screws 82 for compressing rubber O-ring 84. One such fixture assembly 74 is provided by Hayward Pool Products, Inc. under part number SP-1408. In this manner, the pool lighting apparatus of the present invention may be applied to any known type of pool construction.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

I claim as my invention:

1. A pool lighting apparatus comprising:
   fixture having an aperture formed there through;
   a fiber optic light source comprising a fiber optic cable having a length adapted for passing into the fixture aperture and having a light emitting end;
   a lens assembly attached to the fiber optic cable, the lens assembly comprising a lens disposed proximate the light emitting end for receiving light from the light emitting end and transmitting the light into the pool;
   the lens assembly further comprising a first seal apparatus for preventing the introduction of water between the light emitting end and the lens from outside the lens assembly.

2. The pool lighting apparatus of claim 1, further comprising:
   a connector comprising a body having an aperture with a first elastomeric seal disposed therein for receiving the fiber optic cable and a nut threaded onto the body for compression of the first elastomeric seal around the fiber optic cable proximate the light emitting end;
   a lens holder sealed to the lens and in engagement with the connector body with a first seal disposed there between for positioning the light emitting end proximate the lens and for preventing the introduction of water between the light emitting end and the lens.

3. The pool lighting apparatus of claim 2, further comprising a second seal apparatus for preventing the passage of water through the fixture aperture between the lens assembly and the fixture.

4. The pool lighting apparatus of claim 3, wherein the second seal apparatus comprises;
   a second seal disposed proximate a rear portion of the lens holder;
   a lens nut in threaded engagement with the fixture for compressing the second seal between the lens holder and the fixture.

5. The pool lighting apparatus of claim 4, wherein the second seal apparatus further comprises:
   a third seal disposed between the lens nut and the lens holder; and
   a fourth seal disposed between the lens nut and the fixture.

6. The pool lighting apparatus of claim 1, further comprising a cutting ring disposed about the fiber optic cable within the lens assembly, the cutting ring comprising a flat surface.

7. The pool lighting apparatus of claim 1, wherein the lens comprises glass.

8. The pool lighting apparatus of claim 1, further comprising a cover disposed over the lens.

9. The pool lighting apparatus of claim 8, wherein the cover comprises a filter.

10. A fiber optic light source lens assembly comprising:
    a connector body having an aperture with a first elastomeric seal disposed therein for receiving a fiber optic cable;
    a nut threaded onto the body for compression of the first elastomeric seal around the fiber optic cable proximate a light emitting end of the fiber optic cable;
    a lens;
    a lens holder sealed to the lens and in engagement with the connector body for positioning the light emitting end proximate the lens;

a seal disposed between the lens holder and the connector body; and further comprising a cutting ring disposed about the fiber optic cable within the connector body, the cutting ring comprising a flat surface.

11. The assembly of claim 10, used in combination with a pool lighting fixture, further comprising:

a seal surface formed on one of the lens, lens holder, connector body and nut for mating with a surface of a pool lighting fixture;

a lens nut in threaded engagement with the pool lighting fixture for compressing a seal between the seal surface and the fixture.

12. The assembly of claim 10, further comprising a cover disposed over the lens.

13. The assembly of claim 12, wherein the cover comprises a filter.

14. The assembly of claim 10, wherein the lens comprises glass.

* * * * *